United States Patent [19]
Baxi

[11] Patent Number: 5,198,240
[45] Date of Patent: Mar. 30, 1993

[54] PRESSURIZATION CONTROL UNIT FOR A GAS-ASSISTED INJECTION MOLDING MACHINE

[75] Inventor: Indra R. Baxi, Solon, Ohio

[73] Assignee: Nitrojection Corporation, Middlefield, Ohio

[21] Appl. No.: 782,908

[22] Filed: Oct. 24, 1991

Related U.S. Application Data

[63] Continuation of Ser. No. 555,239, Jul. 19, 1990, abandoned.

[51] Int. Cl.[5] .............................................. B29C 45/77
[52] U.S. Cl. ..................................... 425/145; 264/523;
264/572; 425/564
[58] Field of Search ................ 425/145, 564; 264/523, 264/572; 60/413, 416, 418; 417/225, 226

[56] References Cited
U.S. PATENT DOCUMENTS

| | | | |
|---|---|---|---|
| 4,082,226 | 4/1978 | Appleman et al. | 425/564 |
| 4,394,333 | 7/1983 | Fukushima et al. | 264/523 |
| 4,481,768 | 11/1984 | Goshorn et al. | 60/418 |
| 5,039,463 | 8/1991 | Loren | 264/40.3 |

FOREIGN PATENT DOCUMENTS 250080 12/1987 European Pat. Off. .
0298631 6/1988 European Pat. Off. .
0383690 1/1990 European Pat. Off. .

OTHER PUBLICATIONS

T-Line Toggle Injection Molding Machines, Cincinnati Milacron Pamphlet, Jan. 1982.
CAMAC, Cincinnati Milacron Pamphlet Mar. 1984.

*Primary Examiner*—Tim Heitbrink
*Attorney, Agent, or Firm*—Fay, Sharpe, Beall, Fagan, Minnich & McKee

[57] ABSTRACT

A pressurization control unit for use in a gas assisted injection molding process includes a frame and a gas inflow conduit located on the frame. A gas pressurization device is secured to the frame and is in fluid communication with the gas inflow conduit. A gas storage device is secured to the frame and is in fluid communication with the gas pressurization device. A gas outflow conduit is located on the frame with the gas outflow conduit being in fluid communication with the gas storage device. A valve is provided in the gas outflow conduit for selectively allowing an outflow of the pressurized gas from the gas storage device. A control apparatus is located on the frame for controlling the operation of the gas pressurization device and the valve.

25 Claims, 7 Drawing Sheets

PRESSURIZATION CONTROL UNIT FOR A GAS-ASSISTED INJECTION MOLDING MACHINE

This is a continuation of copending application Ser. No. 07/555,239 filed on Jul. 19, 1990 now abandoned.

BACKGROUND OF THE INVENTION

This invention relates generally to plastic injection molding. More specifically, the present invention relates to a pressurization control unit for gas assisted injection molding.

The invention is particularly applicable to a control unit which is utilized during the injection of a viscous fluid, such as a molten plastic, and a non-viscous fluid, such as a gas, into an injection mold in a process known as gas augmented injection molding of plastic materials. However, it should be appreciated by those skilled in the art that the invention has broader applications and may also be adapted for use in many other injection molding environments for both a relatively viscous fluid, such as a plastic or wax, and a relatively non-viscous fluid, such as a gas or liquid, are injected into a mold cavity.

Injection molding processes have been widely used not only for the production of molded articles made of various thermoplastic resins but also for the production of lost wax masters used in the investment casting process. The conventional solid injection molding process generally uses a thermoplastic material.

Solid injection molding employs the steps of injecting a plasticized (melted) thermoplastic material under high pressure into a finite mold space and then allowing the material to cool sufficiently so that it rehardens to the extent that it can retain its shape after removal from the mold. Thermoplastic materials generally shrink during rehardening and unfortunately this shrinkage is exaggerated in heavier wall sections, bosses, ribs, gussets, etc. This usually results in sink marks and warpage in the molded products. As a remedy for this, proposals have recently been made to fill the mold cavity with a plasticized thermoplastic material to a volume less than 100% of the mold space and to utilize an inert gas injected under pressure into the partially plasticized material, as it is cooling and rehardening, to fill the rest of the volume of the mold cavity. The gas enters the part and moves along the paths of least resistance therein. Such paths are normally those areas where the thermoplastic body is thicker and has slower cooling sections such as ribs, flow channels, chamfers, etc. In this way, with a suitably designed part, a continuous network of hollowed out sections can be provided. This network of gas channels provides a uniform pressure distribution system throughout the mold space during part rehardening and cool down, thus minimizing internal stresses. The gas pressure is advantageous for holding the plastic material up against the mold surfaces during rehardening so that sink does not take place at the mold surfaces.

While several types of such nozzles are known to the art, there is no suitable control mechanism thus far available at this time for controlling the actuation of the gas flow into and out of the mold cavity during the process of gas assisted injection molding.

Accordingly, it has been considered desirable to develop a new and improved injection molding apparatus which would overcome the foregoing difficulties and others while providing better and more advantageous overall results.

BRIEF SUMMARY OF THE INVENTION

In accordance with the present invention, a pressurization control unit is provided for use in gas assisted injection molding processes.

More particularly in accordance with the invention, the control unit comprises a frame, a gas inflow conduit located on the frame and a gas pressurization means secured to the frame and in fluid communication with the gas inflow conduit for pressurizing the gas. A gas storage means is secured to the frame and is in fluid communication with the gas pressurization means for storing pressurized gas. A gas outflow conduit is located on the frame and is in fluid communication with the gas storage means and a valve means is provided in the gas outflow conduit for selectively allowing an outflow of the pressurized gas from the gas storage means. A control means is located on the frame for controlling the operation of the gas pressurization means and the valve means.

In accordance with another aspect of the present invention, a controller is provided for a gas assisted injection molding apparatus including a plastic extruder connected to a nozzle controlled by a reciprocating shut-off pin that selectively feeds molten thermoplastic material to the mold cavity of a mold body. The nozzle also selectively feeds gas to the mold cavity as regulated by the controller.

More particularly in accordance with this aspect of the invention, the controller comprises a gas inlet conduit and a first pressure sensing means communicating with the gas inlet conduit for sensing an inlet pressure of the gas. A gas pressurization means is in fluid communication with the gas inlet conduit for pressurizing the gas and a gas reservoir is provided for storing the gas pressurized by the gas pressurization means. A second pressure sensing means is provided for sensing a pressure of the gas in the gas reservoir and a gas outlet conduit is in fluid communication with the gas reservoir. A valve means is located in the gas outlet conduit for selectively allowing an outflow of gas from the gas reservoir. A control circuit means is in operative communication with the gas pressure sensing means, the gas reservoir pressure sensing means, the gas pressurization means, and the valve means for actuating the gas pressurization means and the valve means.

According to still another aspect of the invention, a movable pressurization control unit is provided for use in a gas assisted injection molding process utilizing a nozzle that controls the flow of a molten thermoplastic.

More particularly in accordance with this aspect of the invention, the control unit comprises a frame mounted on wheels and a gas inflow conduit located on the frame. A gas pressure booster pump is secured to the frame and is in communication with the gas inflow conduit. A gas storage tank is secured to the frame with the storage tank being in fluid communication with the gas pressure booster pump. A gas outflow conduit is located on the frame and in fluid communication with the gas storage tank. The first valve is provided in the gas outflow conduit for selectively allowing an outflow of pressurized gas from the gas storage tank. A microprocessor is located on the frame for controlling the operation of the gas pressure booster pump and the first valve.

According to yet another aspect of the invention, a method for fluid assisted plastic injection molding is provided.

More particularly in accordance with this aspect of the invention, the method comprises the steps of introducing a molten stream of a plastic material into a mold space and programming a microprocessor to control the beginning of a step of introducing a gas into the mold space at a preselected time after the beginning of the step of introducing the plastic. Thereafter, the flow of molten plastic material is terminated into the mold space and the flow of gas into the mold space is also terminated. Subsequently, a gas pressure is maintained in the mold spaced for a predetermined period of time. Thereafter, the gas is vented.

One advantage of the present invention is the provision of a new and improved injection molding apparatus.

Another advantage of the present invention is the provision of a control unit for use in a fluid assisted injection molding process.

Still another advantage of the present invention is the provision of a control unit which is compact and is contained in a frame mounted on wheels so that the control unit is portable and can be rolled from place to place as needed.

Yet another advantage of the present invention is the provision of a control unit which is regulated by a microprocessor that can be programmed as desired.

Still yet another advantage of the present invention is the provision of a control unit which is capable not only of controlling the flow of a gas into and out of a gas cavity formed in plastic material injected into a mold cavity but is also capable of operating a pin flow control valve of a mold nozzle.

A further advantage of the present invention is the provision of a gas supply system which is so constructed as to be able to recycle the gas injected into a mold cavity in a gas assisted injection molding process.

A yet further advantage of the present invention is the provision of a gas supply system for gas assisted injection molding in which the gas utilized can be replenished from the environment.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof, and wherein.

DETAILED DESCRIPTION OF THE PREFERRED AND ALTERNATE EMBODIMENTS

Figure 1A:
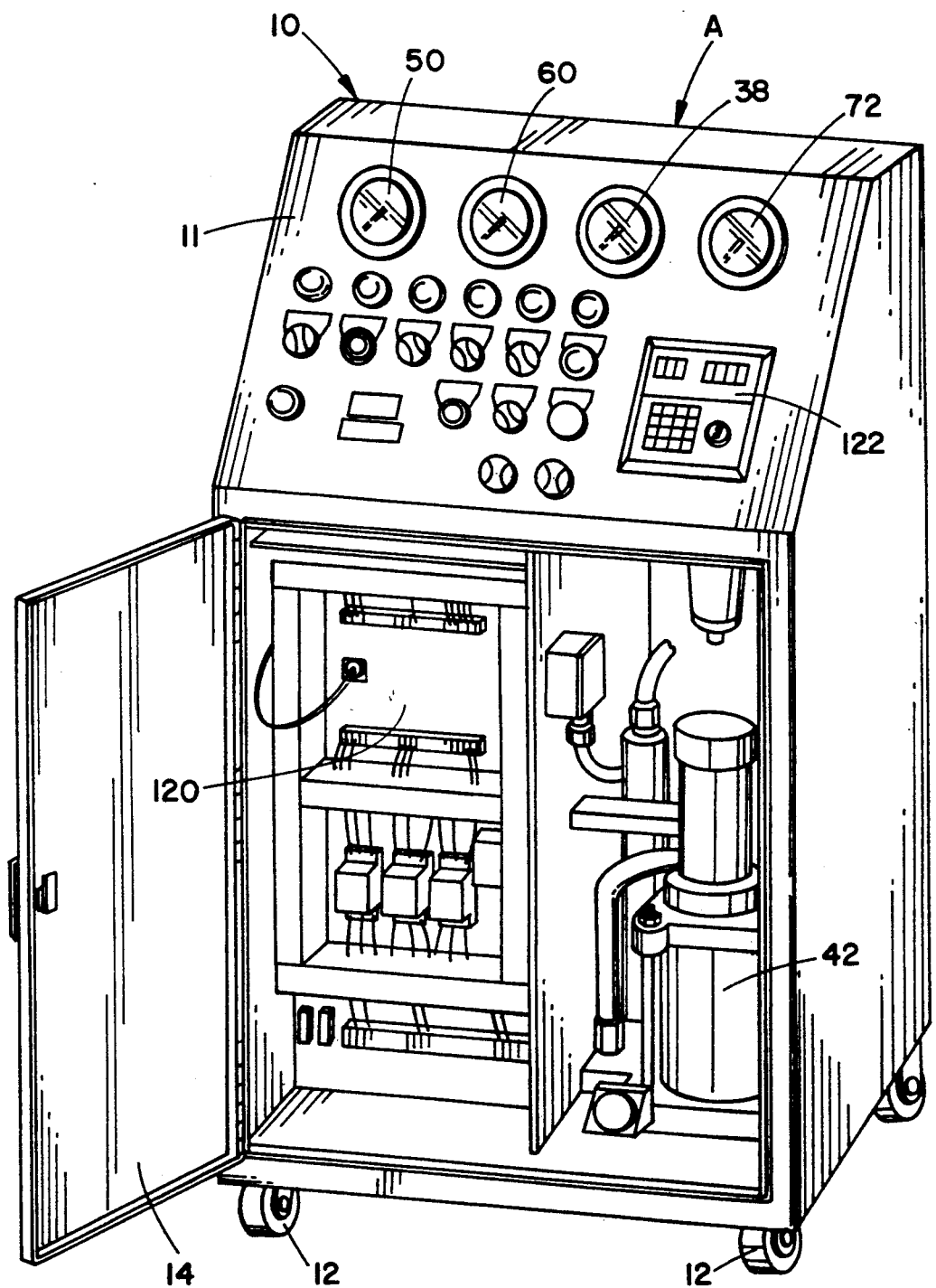
FIG. 1A is a perspective view from a front right side of a pressurization control unit according to the preferred embodiment of the present invention.
Figure 5:
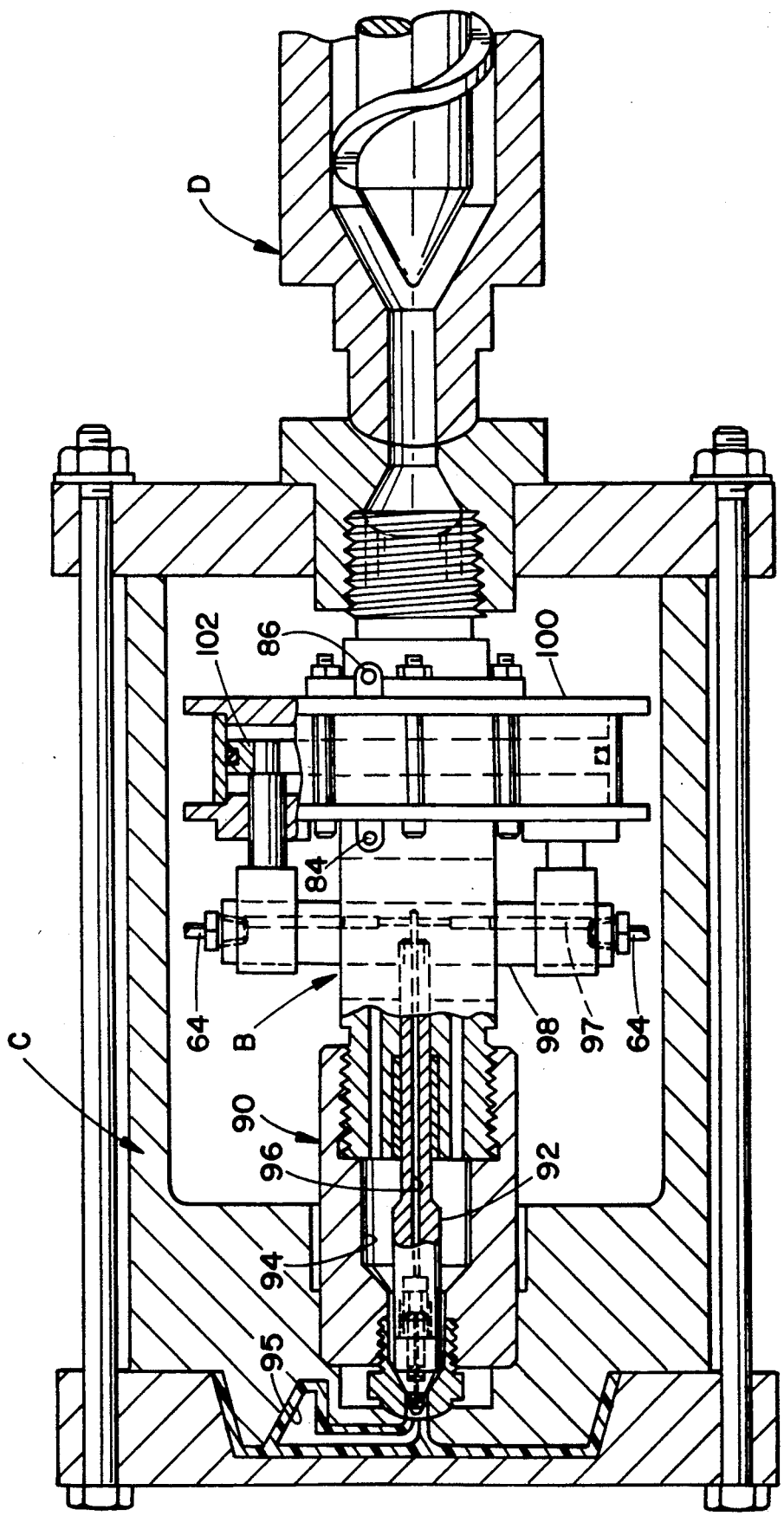
FIG. 5 is a side elevational view in partial cross section of a nozzle which is utilized with a mold and an injection molding machine, the flow of plastic and gas through the nozzle being controlled by the pressurization control unit of FIG. 1A; and, FIG. 6 is a pneumatic circuit diagram of a portion of a pressurization control unit according to an alternate embodiment of the present invention.

Referring now to the drawings, wherein the showings are for purposes of illustrating the preferred and alternate embodiments of the invention only and not for purposes of limiting same, FIG. 1A shows the subject new control unit A while FIG. 5 illustrates the use of the control unit in connection with a nozzle B that is utilized to inject a molten thermoplastic along with a gas into a mold C with the thermoplastic being supplied by an injection molding machine D. While the control unit is primarily designed for and will hereinafter be described in connection with a gas assisted injection molding process in which a neutral gas, such as nitrogen, is used in an injection molding process utilizing a molten thermoplastic, it should be appreciated that the control unit can also be used in various other molding environments in which a relatively viscous fluid and relatively non-viscous fluid, such as steam or a liquid, are injected, into a mold cavity. For instance, the control unit could be adapted for use in the production of lost wax masters and the like.

Figure 2:
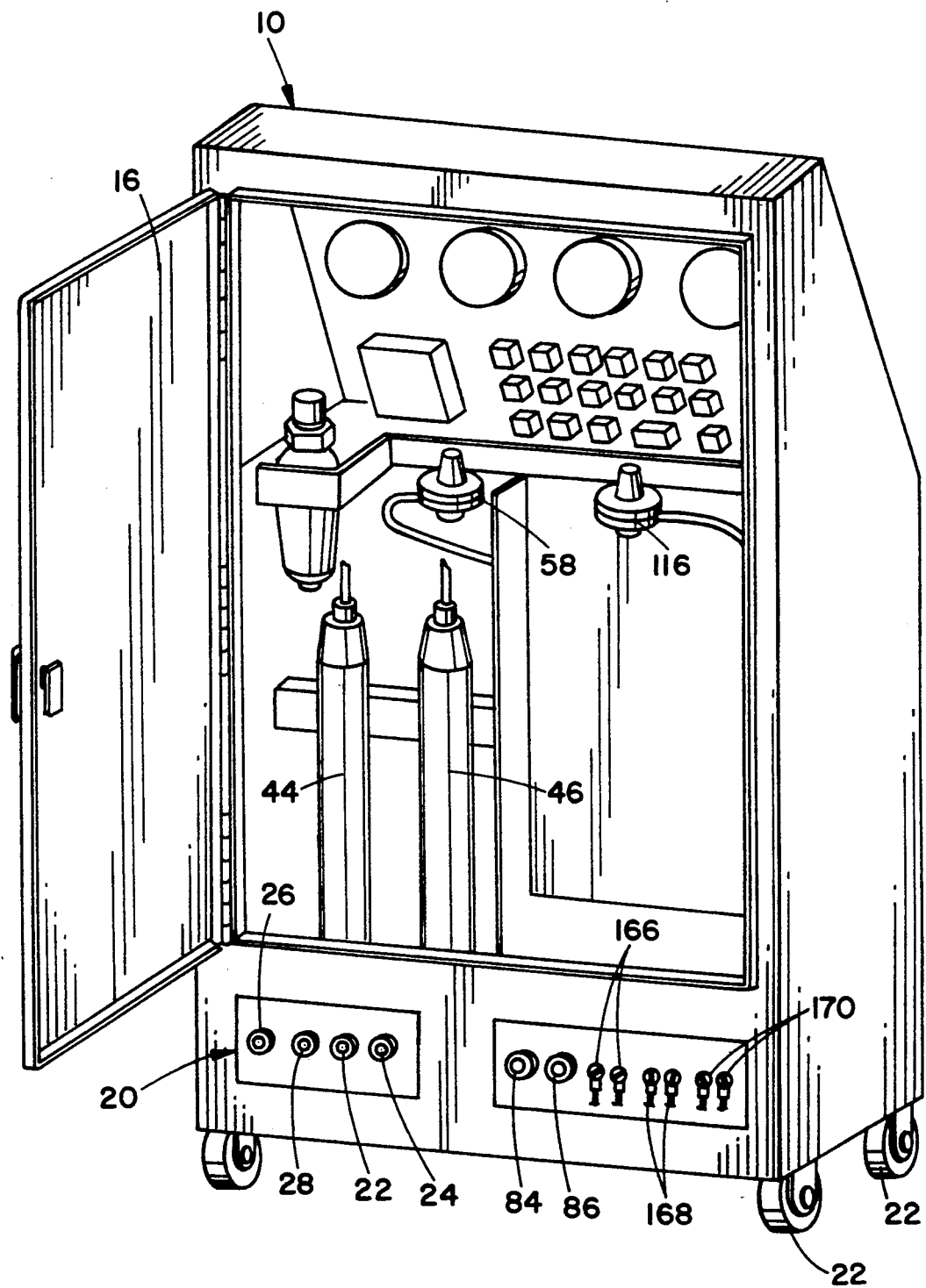
FIG. 2 is a perspective view from a rear left side of the control unit of FIG. 1.

As shown in FIG. 1A, the control unit or controller A has a housing 10, having a control panel 11, which is mounted on casters or wheels 12 so as to allow the housing to be rolled to the needed location. Provided on the housing 10 is a front door 14 which allows access to the components held therein as well as a rear door 16 as shown in FIG. 2. It should be appreciated that an open frame could be provided instead of a housing with doors if so desired.

With continuing reference to FIG. 2, provided below the rear door 16 is a gas manifold 20 which includes a gas inflow conduit 22, a gas outflow conduit 24, as well as a pair of shop air inlet conduits 26 and 28. With reference now also to the pneumatic circuit diagram of FIG. 3, a tank 29 of nitrogen gas or the like is provided outside the control unit A and that tank is connected to the gas inflow conduit or first line 22 in the housing 10 through a conduit 30. Located in the conduit 30 is a filter 31 which is utilized to filter the nitrogen gas. Located within the control unit A is a filter 32 which is utilized to filter shop air provided by a suitable shop air supply source through the first air inlet conduit 26. Another filter 33 is provided for the second air inlet conduit 28. There is a pressure reduction valve 36 located in the conduit 30 downstream from the filter 31 and outside the control unit A. An inlet gas pressure gauge 38 is located in the gas inflow conduit 22 inside the unit A and can be seen on the control panel 11 illustrated in FIGS. 1A and 1B.

Also provided in the circuit is a first control valve 40 for controlling the flow of nitrogen gas from the tank 29, through line 30 and thence through line 22. A pressure intensifier 42 is located in the line 22 downstream from the valve 40 to pressurize the nitrogen gas. Thereafter, the now pressurized gas flows into one or more storage tanks. In the embodiment illustrated, a pair of tanks 44 and 46 are shown which have, preferably, two lines connecting them. One of these is gas inflow conduit line 22 and the other is an auxiliary line 48. It should be recognized that one tank may be adequate for storage of the gas and that if two tanks are provided, line 48 may not be necessary since line 22 connects the tanks 44 and 46. Located downstream from the second tank 46 is a gas hold pressure gauge 50. Provided downstream from the gauge 50 is a pressure sensor 52 which senses when the tanks 44 and 46 contain gas at an adequate pressure.

A solenoid actuated control valve 56 regulates the operation of an air operated valve 58 located in line 22. The valve 58 selectively allows the flow of pressurized gas out of the tanks 44 and 46 and downstream in line 22 towards the mold. A system pressure gauge 60 is located downstream from the valve 58 to sense the pressure of gas in the line downstream from the valve 58. Located adjacent the system pressure gauge 60 is a controllable pressure regulator valve 62 that regulates the flow of pressurized gas into gas outlet line 24 and then to the mold through a second gas conduit 64 (FIG. 5) that communicates with the outlet line 24. The control dial for valve 62 can be found on the panel 11 shown in FIG. 1B. It is evident that numerous check valves are also provided in the line 22 to regulate the flow of gas therethrough.

The air from the shop air line 28 flows through a T-fitting 70 to a first branch 71 so that the shop air pressure can be sensed by an air inlet gauge 72 that also appears on the control panel 11 of the unit illustrated in FIG. 1. Located downstream from the gauge 72 is a control valve 74 that selectively allows the flow of shop air downstream in line 71. The shop air also flows through a second branch 76 to the intensifier 42.

The actuation of the intensifier 42 is controlled by the solenoid actuated valve 74. As is evident from FIG. 3, shop air through line 28 is split at the T-fitting 70 into first and second branches 71 and 76 with the shop air through branch 76 flowing directly into the upper chamber of the intensifier 42 through a pressure regulator valve 77. The control dial for valve 77 can be found on the panel 11 of FIG. 1A. Pilot pressure of the shop air to the intensifier 42 is controlled by a valve 78 which is an air operated valve that, in turn, is controlled by the operation of the solenoid actuated valve 74. Therefore, when shop air is allowed to flow through branch 71, i.e., when valve 74 is open, then air actuated valve 78 will be closed against the resistance of its spring so that no more air can enter the intensifier 42, since air exhaust through a pipe 79 is stopped. This effectively brings the intensifier 42 to a stop. When it is desired to again allow the nitrogen gas to be pressurized by the intensifier 42, then valve 74 is closed by deenergizing the solenoid so that the spring on this valve can resiliently bias the valve to the closed position. At this point, the valve 78 will again open due to the spring bias on the valve. Air from the intensifier can be exhausted through pipe 79 whenever the valve 78 is opened, i.e. whenever valve 74 is closed.

Located in the first air inlet conduit 26 is, as mentioned, a filter 32 as well as a lubricator 80. The conduit 26 leads to a four-way three envelope control valve 82 that can be solenoid actuated to either end position and spring biased to a center off position. Communicating with the valve 82 is a first end conduit 84 and a second end conduit 86 of an air operating pin control valve of the mold. Two shop air inlet lines 26 and 28 have been found advantageous due to the large volume of shop air utilized by the controller A. However, for certain environments one shop air inlet conduit may be adequate.

Figure 3:
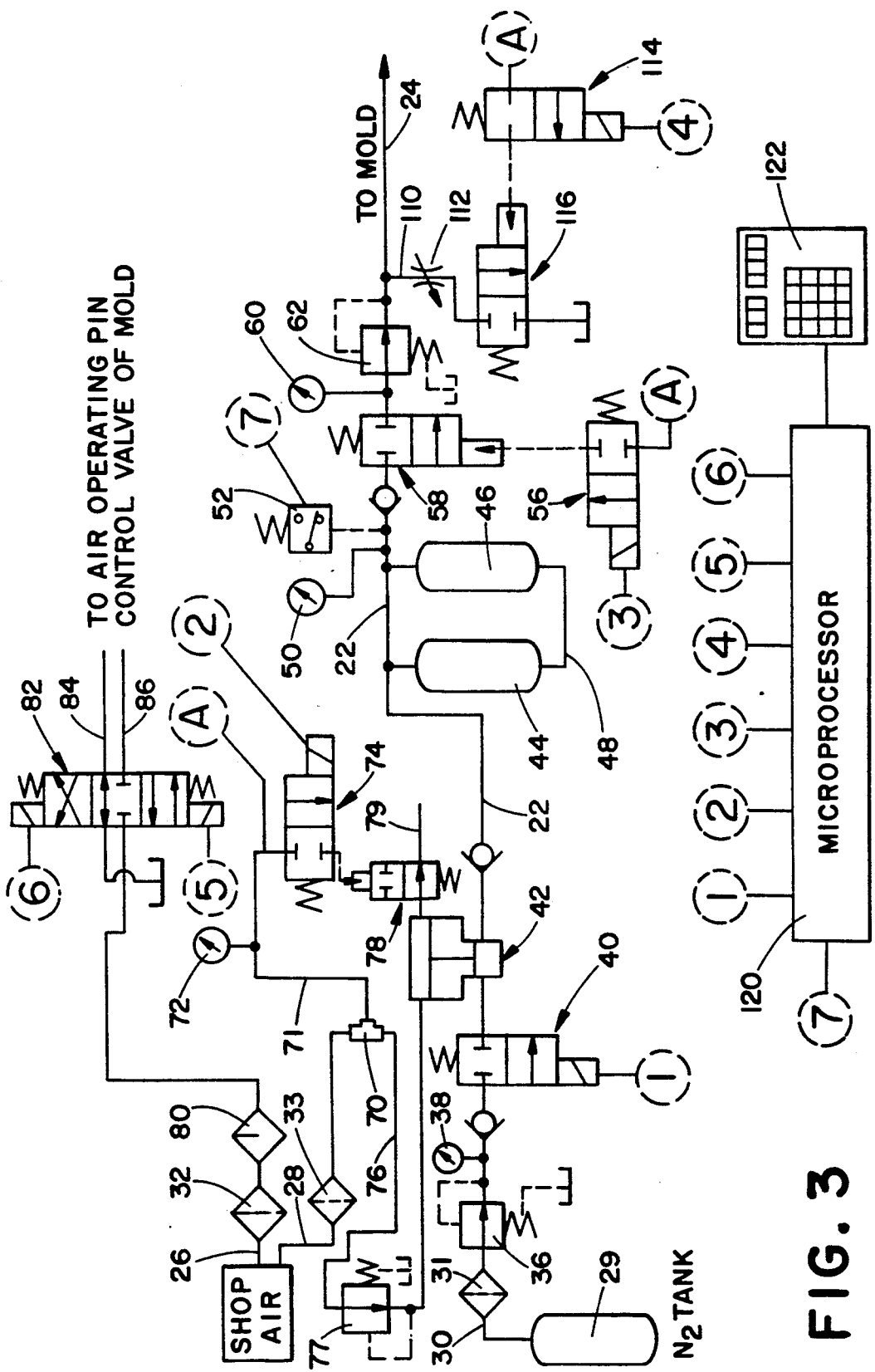
FIG. 3 is a pneumatic circuit diagram of the control unit of FIG. 1A.

While particular types of valves 40, 56, 58, 74, 78, and 82 have been illustrated in the preferred embodiment of FIG. 3, it should be appreciated that many other conventional types of valves can be utilized in order to control and regulate the flow of gases in the control unit A. There is no intention to restrict the scope of the inventive controller only to the types of valves illustrated in FIG. 3.

With reference now to FIG. 5 illustrating the molding apparatus, the gas is injected through a nozzle body 90 having therein a pin 92 which reciprocates to control the flow of thermoplastic from the molding machine D into the mold C. A bore 94 extends longitudinally through the nozzle body 90 in order to allow the flow of molten thermoplastic into a mold cavity 95 in the mold C. The reciprocation of the pin 92 in the bore 94 selectively allows the flow of such molten thermoplastic from the molding machine D to the mold C. Extending through the pin 92 is a gas conduit 96 which communicates with a suitable conduit 97 provided in a cross bar 98 to which the pin 92 is secured. In this way, gas can flow from conduit 64 through the pin conduit 96 and into the mold cavity 95. The cross bar 98 is secured to a reciprocating mechanism 100 that controls the movement of the pin and the cross bar. It is noted that the first and second end conduits 84 and 86 communicate with the reciprocating mechanism 100 in order to regulate the flow of shop air to the sides of a piston 102. The reciprocating mechanism 100 thereby actuates the movement of the pin 92 in the nozzle body 90.

With reference now again to FIG. 3, also located in the housing 10 is an outflow conduit 110 which is in fluid communication with the pressurized gas to mold conduit 24. Provided in the outflow conduit 110 is a flow metering orifice 112. It should be recognized that a metering valve or a similar conventional component could replace the orifice 112 if desired. A solenoid operated control valve 114 selectively allows shop air to flow to an air operated valve 116 that opens and closes the outflow conduit 110 downstream from the orifice 112. On the other hand, the orifice 112 could be downstream from the valve 116, if desired. The vented gas flowing past valve 116 can, if desired, be released directly into the atmosphere since the gas is, preferably, only nitrogen. It should be noted that shop air can be used from line 71 to power the air operated valves 56 and 114 as shown by a connection illustrated only by the circled letter A, for simplicity.

Controlling the operation of the various solenoids of valves 40, 56, 74, 82 and 114 is a microprocessor 120 as shown by the circled numbers 1–7. The microprocessor can, if desired, be numerically programmable through a suitable keyboard 122. The keyboard is preferably provided on the control panel 11 of the unit A as shown in FIG. 1B.

Figure 1B:
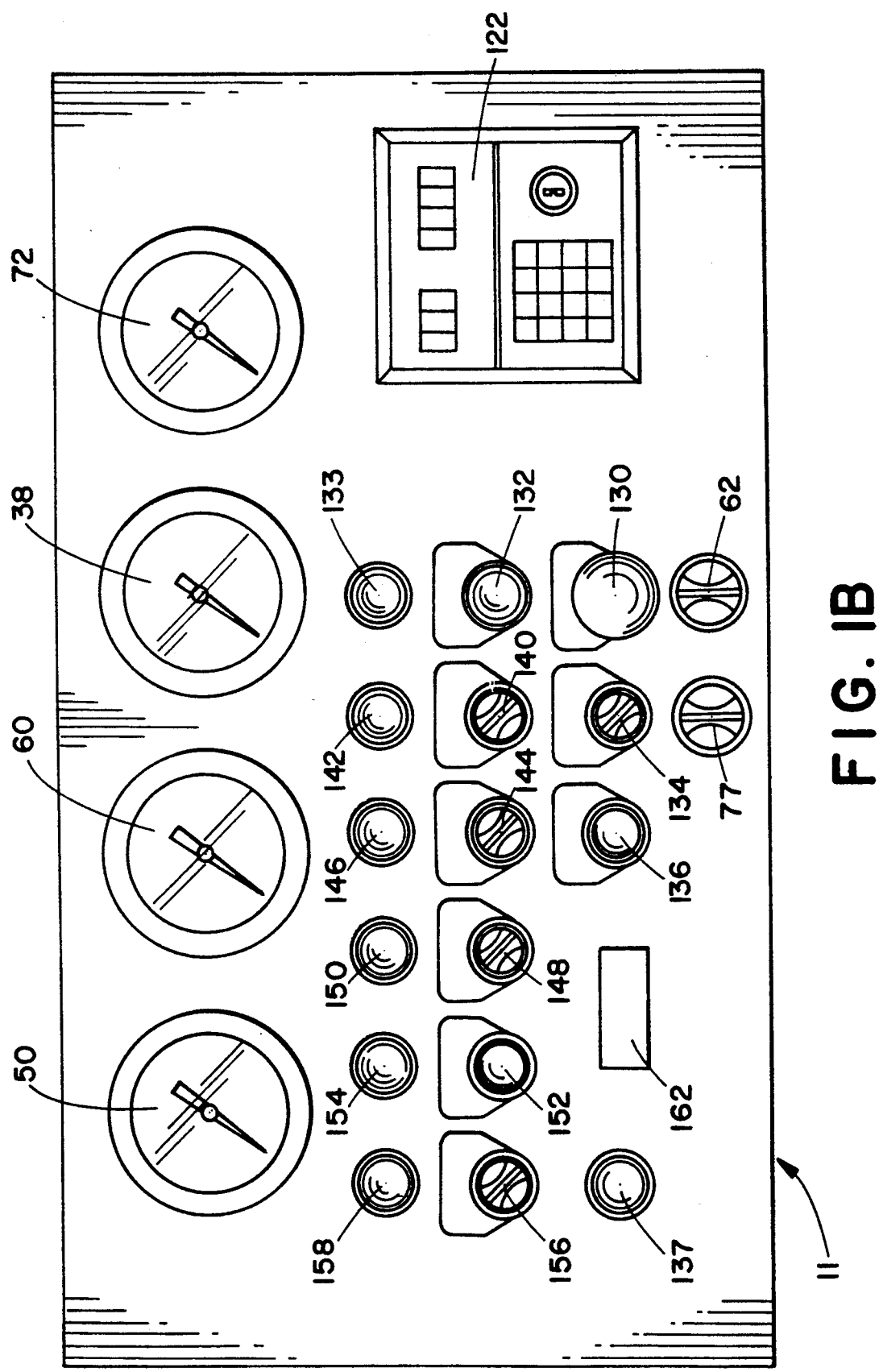
FIG. 1B is an enlarged top plan view of an electronic control panel of the control unit of FIG. 1A.

Further provided on the control panel 11 shown in FIG. 1B are a number of controls. Located next to the keyboard 122 is a master switch 130 which can be of the push-pull variety if desired. The master switch selectively provides electricity for the remaining components in the controller A. When the master switch is pulled to the on position, an indicator light 132 located thereabove is illuminated. An indicator light 133 is located above the light 132. The light 133 is illuminated when electricity is provided the controller A even if the push-pull switch 130 is in the off position. Located to the left of the master switch 130 is a rotatable control switch 134 which regulates the operation of the controller A to either automatic or manual as desired. Located adjacent the switch 134 is a buzzer 136 for sounding a warning when the gas inlet pressure through line 22 drops to below an acceptable level. A warning light 137 is also illuminated at this time.

A rotatable gas supply to booster switch 140 is located above the switch 134. When the gas supply switch 140 is on, an indicator light 142 lights. Located next to the switch 140 is a rotatable air to booster switch 144. When this switch is activated, an indicator light 146 is illuminated. Located adjacent the switch 144 is a rotatable gas into mold switch 148 which, when activated, will allow gas to flow into the mold cavity. An indicator light 150 is located above this switch to show that the switch is on.

Further provided on the control panel 11 is a gas return from mold push button 152 which, when activated (pushed in against the bias of a spring return), allows gas to flow back through line 110 by operating valves 114 and 116 as shown in FIG. 3. When the push button 152 is pushed in, an indicator light 154 is illuminated. A rotatable shut-off nozzle switch 156 is located next to the push button 152. When activated, the switch 156 trips an indicator light 158.

Also provided is a counter window 162 that shows how many times the system has been utilized, i.e., how many injection molding cycles the system has gone through. As mentioned, the dials of the two pressure regulator valves 62 and 77 are also located on the control panel 11.

The controller A is also connected by electrical and pneumatic lines to the molding machine D, the nozzle B and the mold C. More specifically, as shown in FIG. 2, electrical lines 166 provide the power supply to the controller A which power supply is regulated by the master push-pull control 130. Electrical lines 168 provide an interface signal to and from the injection molding machine D. This is a key to the operation of both of the systems so that they can work together to produce a component. Optionally, a pair of interlock electrical lines 170 can be provided to interlock the machine signal to the controller signal.

During the pre-injection sequence, the operation of the system is as follows: the power is turned on by connection of the power supply cables or lines 166 to, e.g., a 110 volt AC power source and light 133 is illuminated. The master switch 130 is pulled on and the red light 132 thereby will turn on. The rotatable manual/auto selector switch 134 is turned to the manual position. A gas line 30 from the tank 29 is connected to the controller A at line 22 and two shop air lines are connected at 26 and 28 to the controller A. Then nitrogen gas is allowed to flow in through line 22 and air is allowed to flow in through lines 26 and 28. The rotatable gas on-off selector switch 140 is turned on and indicator light 142 will light. The amplifying booster 42 will now start compressing gas to a set pressure as regulated by the microprocessor 120. Gas line leakages are checked and gas can be vented or purged by turning the rotatable gas into mold selector valve 148 to the "on" position. This will purge the gas through the nozzle 90.

Then air is connected to the pin control valve 82 through lines 84 and 86 and the rotatable nozzle open/close selector switch 156 is held in each position to see the proper functioning of the shut off nozzle pin 92. Gas line leakages are again checked and the vent valve 116 is operated by pressing the gas return from mold push button 152 with the gas on/off selector switch 140 in the "on" position. Gas should discharge from the gas in mold line outlet and also from the mold vent outlet through line 110. Thereafter, the automatic cycle can be selected by turning the manual/auto selector switch 134 to "auto". The gas transfer system is now ready for automatic operation since it is interconnected with the injection molding machine.

Figure 4:
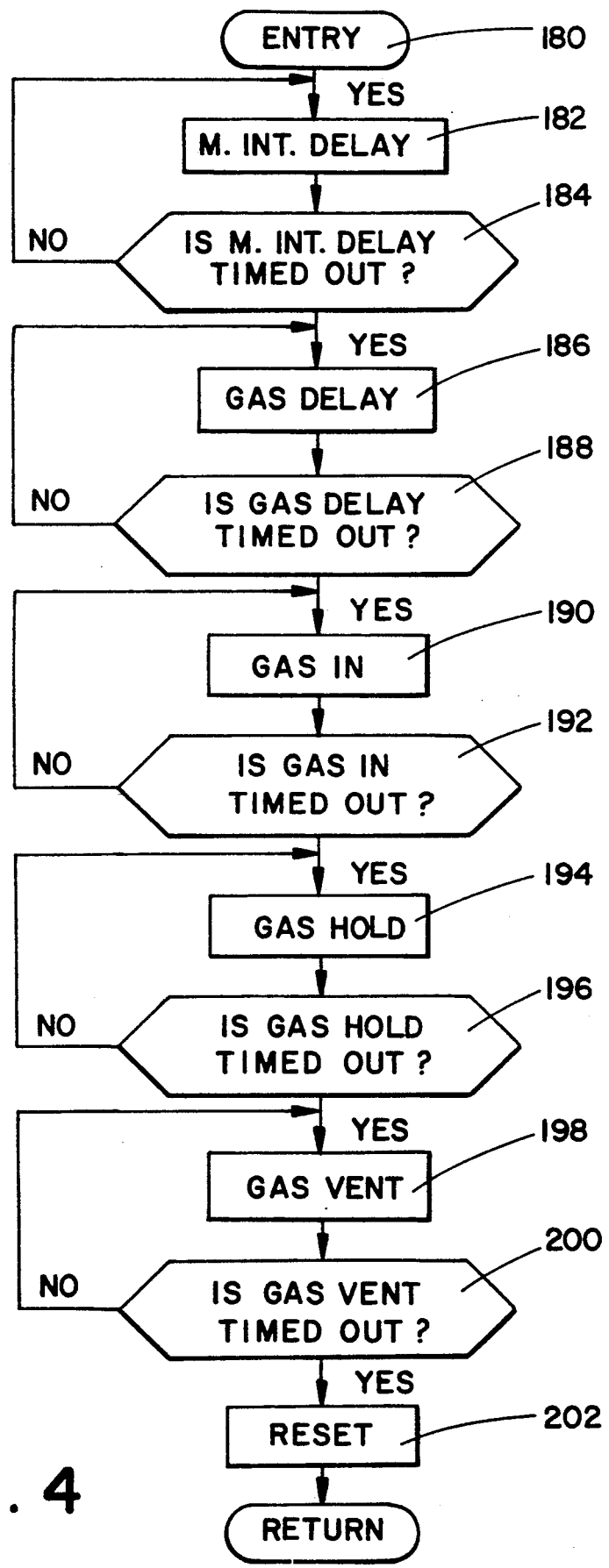
FIG. 4 is a flow chart of the operation of the control unit of FIG. 1A.

With reference now also to FIG. 4, the injection/compression sequence of the controller is as follows: the hydraulics of the injection molding machine D are activated. The shot size is adjusted and the machine D is refilled. Plastic material injection then begins and the shut off nozzle is opened and machine signal interface timer start is set at e.g., 0.1 second. In the software program running on the micro-computer 120, the system delay is set (at 0.1 second) as shown in block 182. Also set is the gas delay shown in block 186, the gas in shown in block 190, the gas hold shown in block 194 and the gas vent shown in block 198. Once all of these parameters have been programmed into the microcomputer 120, the system is ready for activation.

As mentioned, the system delay can be on the order of 0.1 second. When this times out, as shown in block 184, the injection of the plastic material through the nozzle B from the molding machine D begins. A gas delay timer shown in block 186 can be set for e.g., 1.5 seconds if the plastic injection speed of the injection unit is on the order of 3 seconds for injection of the entire shot of plastic. Once the gas delay 186 times out as shown by block 188, then the gas in sequence starts. In other words, valve 58 is activated to the open position by valve 56 so that pressurized gas can now flow through lines 24 and 64 as well as 97 and 96 into the mold cavity 95. High pressure gas therefore flows into the melt held in the mold cavity. The "gas in" time can be set to approximately 4 seconds if desired.

Once the "gas in" is timed out as shown by block 192, the valve 58 is again closed and the "gas hold" time period is activated. The hold time can be set for, e.g., 20 seconds if so desired. Once the "gas hold", as illustrated in block 194, times out as shown in block 196, the "gas vent" process is begun, i.e., the valve 116 is opened by a solenoid actuated valve 114 so that gas may then flow out of the mold cavity 95 through lines 96, 97, 64, 24 and 110. Therefore, the gas cavity formed in the molded material is decompressed to near atmospheric pressure. Once the "gas vent" illustrated in block 198 times out as shown in block 200, the system is reset as shown in block 202. The reset may take approximately 1 second or thereabouts. At this point, the system is ready for the next cycle. The injection cycle is now complete, the mold C can be opened, and the plastic part can be ejected or removed. The mold can thereupon be closed to begin the next cycle. It should be appreciated that the various times mentioned above only apply for a particular type of plastic being used to form a specific type of injection molded product in a particular type of mold cavity. Various time periods can be programmed into the microcomputer 120 as required. Also the controller can be used either in simultaneous injection molding or post injection molding as desired.

The microcomputer 120 can be an Allen Bradley 1745-SLC150 microprocessor and the keypad 122 can be an Allen Bradley 1745-TCAT processor keypad, if desired. The valves 58 and 116 can be Pressure Products Co. 10K ATO/C high pressure valves which are good to 10,000 psi, which are distributed by the High Pressure Equipment Co., or similar suitable valves. The solenoid operated valves 56 and 114 can be suitable conventional valves such as Allen air solenoid valves or the like. The high pressure gas booster pump 42 can be an Autoclave DLE model booster or intensifier or a similar suitable component. While particular types of components have been mentioned as being used with the controller A, it should be appreciated that other types of conventional microprocessors, valves, booster pumps, and the like could also be utilized for the controller.

In order to close the system down, the molding machine D should be emptied of the molten plastic material and the machine should be placed in a manual mode. After the reset timer times out, the auto manual selector switch 134 should be turned to manual. Then the gas in mold on/off selector switch 148 should be turned to the "on" position to evacuate the high pressure gas from the system. This will also ensure that the gas lines are clean of any foreign material. Then the air to the booster 42 is cut off by turning the air to booster on/off selector switch 144 to the "off" position. Thereafter, flow from the nitrogen tank 29 as shown in FIG. 3 is blocked and the gas to the booster is cut off by turning the gas to booster on/off selector switch 140 to the "off" position. Then all the various machine controls for the molding system B, C, and D such as heating controls, hydraulics, water supplies, and the like, are shut down and finally the power to the controller A is turned off by pushing the master on switch 130 to the "off" position so that the light 132 is no longer lit.

Figure 6:
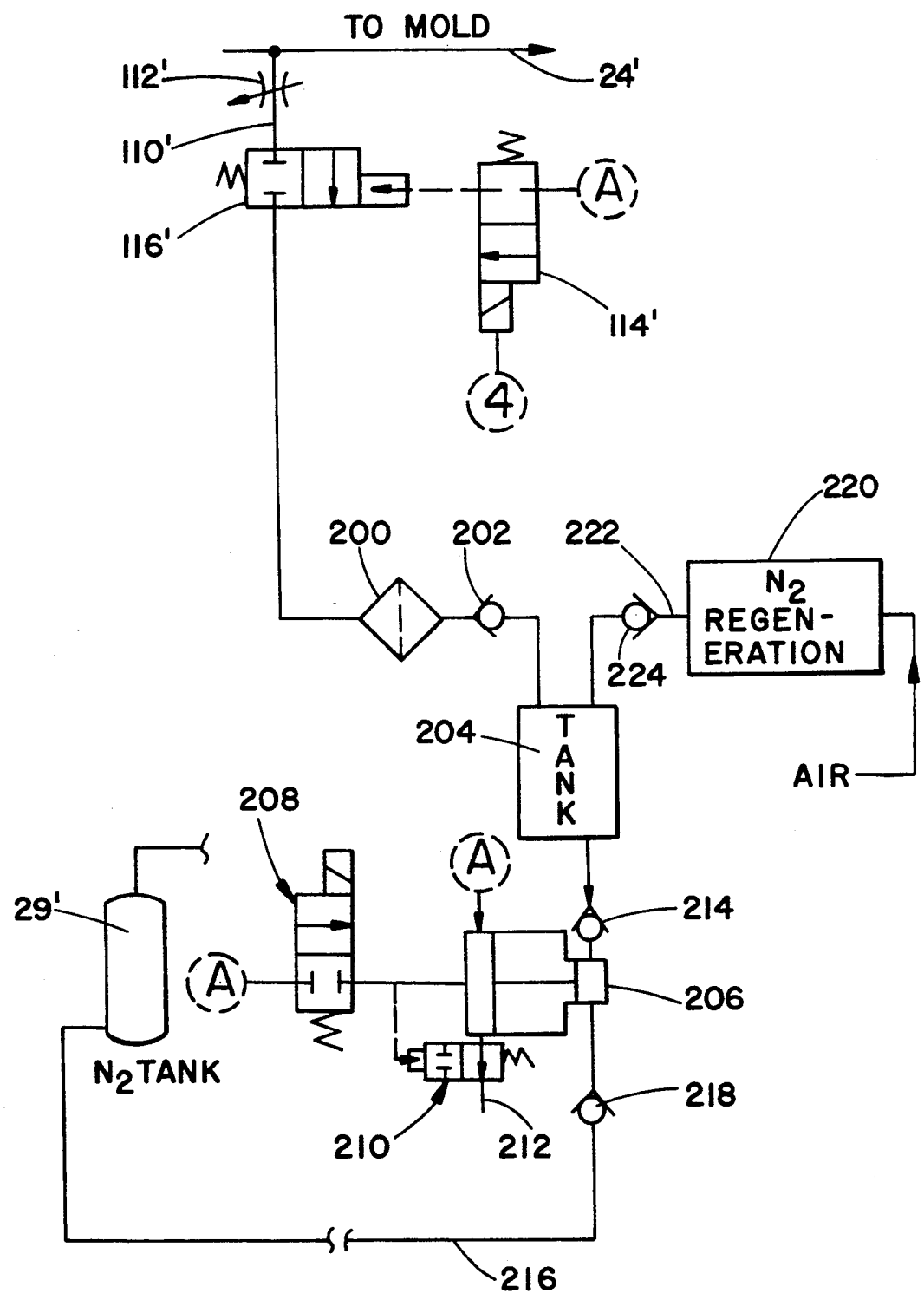

With reference now to FIG. 6, an alternate embodiment of the pneumatic circuit diagram of FIG. 3 is there illustrated. For ease of illustration and comprehension of this alternative, like components are identified by like numerals with a primed (') suffix and new components are identified by new numerals.

In this embodiment, the gas which is vented from the mold cavity through line 110 of FIG. 3 is recycled rather than being vented to the atmosphere. For this purpose, gas which flows out through line 24' and line 110' through a flow controller 112', as allowed by air operated valve 116' which is controlled by solenoid operated valve 114', flows further through line 110' to a filter 200 which removes impurities, such as plastic particles or the like which flake off the molded part, from the gas. The gas then travels through a check valve 202 to a storage tank 204. The gas may be held in this storage tank until needed. When needed, the gas flows out of the tank and is pressurized by use of a booster 206 which can be identical to the booster 42 illustrated in FIG. 3. The booster 206 is powered by shop air through the connection illustrated by A in a circle. As in the first intensifier 42, the second intensifier or booster 206 is regulated in its operation by a solenoid operated valve 208 which controls the operation of an air operated valve 210. The latter valve 210 selectively allows the exhaust of shop air from the intensifier 206 to the atmosphere through a suitable conduit 212. When the conduit 212 is open, shop air can enter the intensifier 206 in order to reciprocate the piston therein thereby pressurizing the nitrogen gas. When, however, the line 212 is closed through the actuation of the solenoid operated valve 208 and hence the closing of the valve 210, then the intensifier 206 is disabled.

In order to prevent the now pressurized gas from flowing back into the tank 204, a check valve 214 is provided in the line 110' between the tank 204 and the booster 206. Provided in a line 216 downstream from the booster 206 is a second check valve 218. The line 216 leads to a nitrogen tank 29'. In this way, gas which is exhausted from the gas cavity formed in the body molded in the mold cavity can then be recycled and reused.

It is contemplated that all of the circuitry thus far discussed in relation to FIG. 6 could be provided in a suitable housing along the lines of the housing 10 disclosed in FIG. 1.

If there is not enough gas being recycled, it is also possible to utilize a conventional nitrogen regeneration unit such as is illustrated at 220. Such a unit takes in air and withdraws therefrom the nitrogen that commonly constitutes more than 75% of the air. One known nitrogen regeneration unit is the CPA-1 model sold by the C.M. Kemp Welding and Gas Equipment Co. That unit concentrates the nitrogen to about 95-98% of the gas volume and the concentrated nitrogen gas is led through a line 222 past a check valve 224 and into the tank 204. In this way, new nitrogen gas is supplied to the tank 204, if necessary, along with the exhausted nitrogen gas from the mold cavity so that sufficient nitrogen gas is available for the booster 206 to supply the nitrogen tank 20'. The advantage of this system is that no additional bottles of nitrogen gas are needed during the gas assisted injection molding process thereby decreasing the cost of the process. The nitrogen regeneration unit can be held in a separate housing or the same housing as the controller if desired.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the preferred and alternate embodiments, the invention is claimed as follows:

1. A pressurization control unit for use in a gas-assisted injection molding process, comprising:
   a housing;
   a gas inflow conduit located in said housing and having one end extending to an outer periphery of said housing;
   a pump, located in said housing and in fluid communication with another end of said gas inflow conduit, for pressurizing a gas;
   a gas storage means, located in said housing and in fluid communication with said pump, for storing the pressurized gas;
   a gas outflow conduit located in said housing and having one end extending to an outer periphery of said housing, another end of said gas outflow conduit being in fluid communication with said gas storage means;
   a valve means provided in said gas outflow conduit for selectively allowing an outflow of the pressurized gas from said gas storage means; and,
   a first control means comprising a microprocessor, located in said housing, for directly actuating said pump and controlling an operation of said valve means.

2. The unit of claim 1 further comprising a programming means for controlling the operation of said microprocessor.

3. The unit of claim 1 wherein said pump comprises a pressurized air actuated intensifier and further comprising:

a shop air conduit located in said housing and having one end extending to an outer periphery of said housing, another end of said shop air conduit being in communication with said pump.

4. The unit of claim 1 further comprising a control panel located on said housing, said control panel comprising:
  a first gauge means, located in said housing, for indicating an inlet pressure of the gas before it is acted on by said pump; and,
  a second gauge means, located in said housing, for indicating the pressure of the gas held in said gas storage means.

5. The unit of claim 3 further comprising a gas manifold located on said housing, said gas manifold including said one end of said gas inflow conduit and said one end of said gas outflow conduit wherein said gas manifold further includes said one end of said shop air conduit.

6. The unit of claim 1 further comprising a second control means located in said housing for actuating a movement of a shut-off pin of an associated injection molding nozzle.

7. The unit of claim 1 further comprising a recycling means for recycling the gas to said pump after it has been used in the gas assisted injection molding process.

8. The unit of claim 1 further comprising a wheel means secured to said housing for enabling said housing to be readily moved in relation to a floor surface.

9. A controller for a gas-assisted injection molding apparatus including a plastic extruder connected to a nozzle, controlled by a reciprocating shut-off pin, that selectively feeds molten thermoplastic material to a mold cavity of a mold body, the nozzle also selectively feeding a gas to the mold cavity as regulated by the controller, the controller comprising:
  a gas inlet conduit;
  a first pressure sensing means communicating with said gas inlet conduit for sensing an inlet pressure of the gas;
  a first pump in fluid communication with said gas inlet conduit for pressurizing the gas;
  a gas reservoir for storing the gas pressurized by said pump;
  a second pressure sensing means for sensing a pressure of the gas in said reservoir;
  a gas outlet conduit in fluid communication with said gas reservoir;
  a valve means in said gas outlet conduit for selectively allowing an outflow of gas from said reservoir; and,
  a microprocessor in operative communication with said gas inlet pressure sensing means, said gas reservoir pressure sensing means, said pump and said valve means, said microprocessor directly actuating said pump and controlling an operation of said valve means.

10. The controller of claim 9 wherein said microprocessor includes a programming means for controlling an operation of said microcomputer.

11. The controller of claim 9 wherein said gas storage means comprises at least one storage cylinder.

12. The controller of claim 9 wherein said pump comprises a pressurized air actuated pressure intensifier and further comprising:
  a first valve which selectively allows pressurized air to flow out of one end of said intensifier; and a second valve which selectively allows gas to flow into anther end of said intensifier to be pressurized, said microprocessor controlling the operation of said first and second valves.

13. The controller of claim 9 further comprising a control means for actuating a movement of the shut-off pin.

14. The controller of claim 9 further comprising a valve, located in a branch of said gas outlet conduit, for controlling an outflow of gas from a gas cavity formed in a plastic body that is molded in an associated mold cavity, wherein an operation of said valve is controlled by said microprocessor.

15. The controller of claim 9 further comprising:
  a shop air conduit; and,
  a valve for controlling a flow of shop air to an actuating mechanism of the shut off pin of the injection molding nozzle, wherein said valve is actuated by said microprocessor.

16. The controller of claim 9 further comprising a valve located in said gas inflow conduit for controlling a flow of the gas through said gas inflow conduit, wherein said valve is manually controlled.

17. The controller of claim 9 further comprising a recycling means for recycling the gas after it has been used.

18. The controller of claim 11 wherein said recycling means comprises:
  a filter for filtering the gas; and,
  a second pump for increasing the pressure of the gas.

19. The controller of claim 18 further comprising a gas regeneration unit for feeding fresh gas to said second pump in addition to the gas recycled.

20. A pressurization control unit for use in a fluid-assisted injection molding process, comprising:
  a housing;
  a fluid inflow conduit located on said housing;
  a fluid pressurization means, located in said housing and in fluid communication with said fluid inflow conduit, for pressurizing a fluid;
  a fluid storage cylinder, located in said housing and in fluid communication with said fluid pressurization means, for storing the pressurized fluid;
  a fluid outflow conduit located on said housing, said fluid outflow conduit being in fluid communication with said fluid storage cylinder;
  a valve means provided in said fluid outflow conduit, and secured to said housing, for selectively allowing an outflow of the pressurized fluid from said fluid storage cylinder; and,
  a programmable microcomputer, located in said housing, for directly actuating said fluid pressurization means and for controlling an operation of said valve means.

21. The unit of claim 20 wherein said fluid pressurization means comprises a pressurized air actuated intensifier.

22. The unit of claim 20 further comprising:
  a first gauge means, secured to said housing, for indicating an inlet pressure of the fluid before it is acted on by said fluid pressurization means;
  a second gage means, secured to said housing, for indicating the pressure of the fluid held in said fluid storage cylinder; and
  a manually actuated power switch, located on said housing, for allowing electricity to flow to said microcomputer.

23. The unit of claim 20 further comprising a control means, located on said housing, for actuating a movement of a shut-off pin of an associated injection molding nozzle.

24. The unit of claim 20 further comprising a recycling means for recycling the fluid to said fluid pressurization means after it has been used in the fluid assisted injection molding process.

25. The unit of claim 20 wherein said housing comprises a substantially enclosed cabinet having at least one door.

* * * * *

(12) EX PARTE REEXAMINATION CERTIFICATE (6745th)
United States Patent
Baxi

(10) Number: US 5,198,240 C1
(45) Certificate Issued: Apr. 7, 2009

(54) PRESSURIZATION CONTROL UNIT FOR A GAS-ASSISTED INJECTION MOLDING MACHINE

(75) Inventor: Indra R. Baxi, Solon, OH (US)

(73) Assignee: Bauer Compressors, Inc., Norfolk, VA (US)

Reexamination Request:
No. 90/007,874, Jan. 17, 2006

Reexamination Certificate for:
Patent No.: 5,198,240
Issued: Mar. 30, 1993
Appl. No.: 07/782,908
Filed: Oct. 24, 1991

Related U.S. Application Data

(63) Continuation of application No. 07/555,239, filed on Jul. 19, 1990, now abandoned.

(51) Int. Cl.
*B29C 45/17* (2006.01)

(52) U.S. Cl. .................. 425/145; 264/523; 264/572; 425/564

(58) Field of Classification Search .................. None
See application file for complete search history.

(56) References Cited

U.S. PATENT DOCUMENTS 4,935,191 A 6/1990 Baxi ..................... 264/572
5,114,660 A 5/1992 Hendry ................. 264/572

OTHER PUBLICATIONS

Allen–Bradley "User's Manual," Publication 1745–800–Nov. 1987.
Allen–Bradley "Self–Teach Manual," Publication 1745–800A–Mar. 1988.
Modern Plastics Encyclopedia 88, vol. 64, No. 10A, Oct. 1987.
Mechanical Design and Systems Handbook, 2d Ed., Ch. 42, (c) 1985.

*Primary Examiner*—Krisanne Jastrzab

(57) ABSTRACT

A pressurization control unit for use in a gas assisted injection molding process includes a frame and a gas inflow conduit located on the frame. A gas pressurization device is secured to the frame and is in fluid communication with the gas inflow conduit. A gas storage device is secured to the frame and is in fluid communication with the gas pressurization device. A gas outflow conduit is located on the frame with the gas outflow conduit being in fluid communication with the gas storage device. A valve is provided in the gas outflow conduit for selectively allowing an outflow of the pressurized gas from the gas storage device. A control apparatus is located on the frame for controlling the operation of the gas pressurization device and the valve.

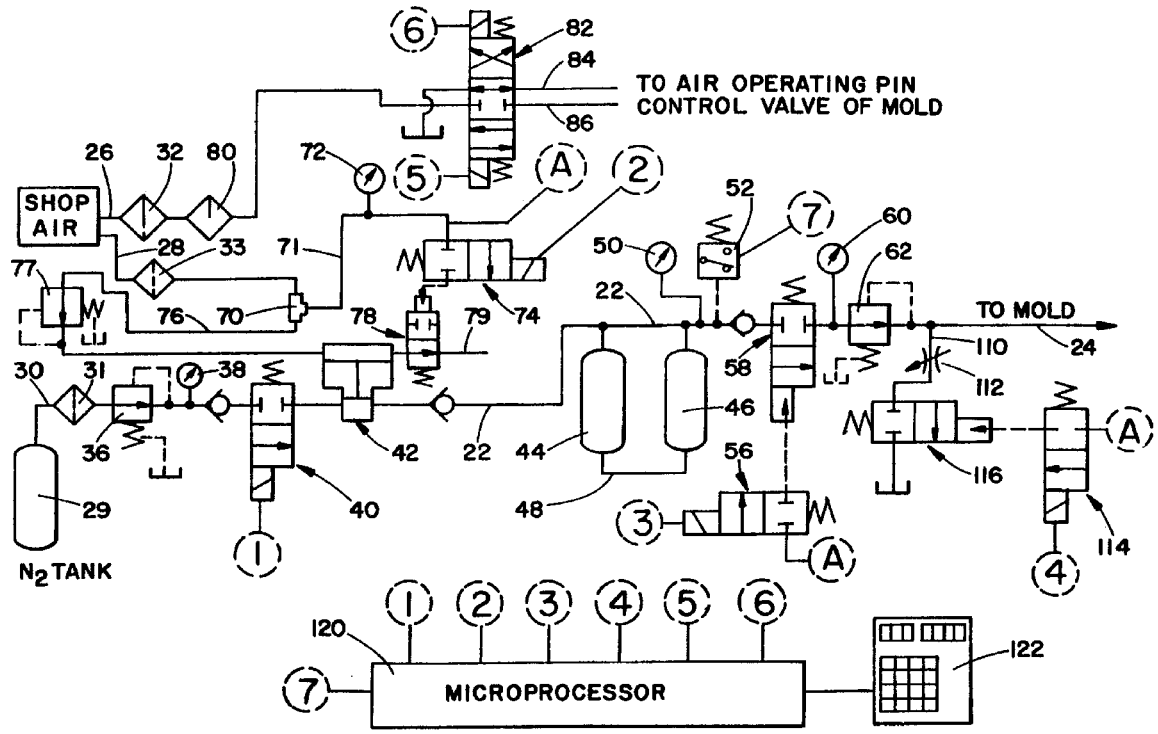

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 1–8 is confirmed.

Claims 9–25 are cancelled.

* * * * *